May 1, 1956  H. W. KAATZ ET AL  2,743,673

PUMP-MOTOR UNIT

Filed Aug. 1, 1950

INVENTOR.
HERBERT W. KAATZ
& HAROLD F. ENYEART
BY

ATTORNEYS

United States Patent Office 2,743,673
Patented May 1, 1956

2,743,673

PUMP-MOTOR UNIT

Herbert W. Kaatz and Harold F. Enyeart, Elyria, Ohio, assignors to The American Crucible Products Company, Lorain, Ohio, a corporation of Ohio Application August 1, 1950, Serial No. 177,012

12 Claims. (Cl. 103—87)

This invention relates to submersible electrically driven pump and motor units and more particularly to improvements in the features and combinations of housing, pump and motor elements.

It is among the objects of our invention to provide a submersible pump and motor unit, integrated and contained in a single housing with the motor and related starting and electrical parts hermetically sealed and bathed in oil and directly and mechanically connected to the pump to be driven thereby and sealed therefrom. Another object is to provide that such a unit shall be economical of manufacture, rugged in construction and reliable and efficient in operation over a long period of life and under a wide variety of conditions of operation.

More specifically it is an object of our invention to provide a pump chamber in the unit and housing that enhances the capacity and efficiency of the pump, facilitates assembly and operation of the parts, and protects the motor seal and bearings. Another object is to provide an advantageous mounting for and assembly of the rotating pump and motor parts in relation to the housing and related parts, and to provide a mounting and sub-assembly of stator and electrical parts for quick and true aligned and located assembly and coaction with the rotating parts. Another object is to provide for life-long lubrication, sealing, insulation and moisture-freeness of the motor, starting switch, bearings, electrical leads and rotary seal and to provide for cooling and thermal expansion and contraction of the insulating and lubricating oil in the unit. Another object is to eliminate condensation and subsequent corrosion within the motor chamber and with respect to any of the parts therein.

Figure 1:
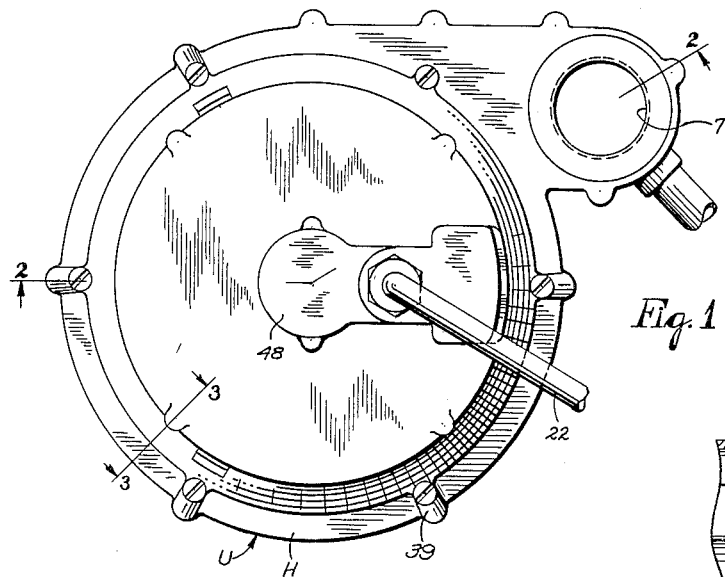
Figure 3:
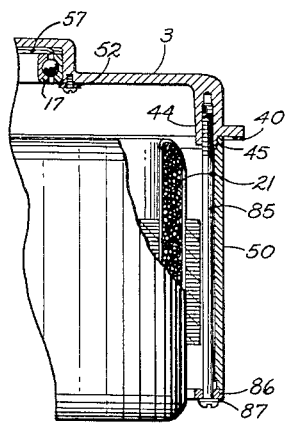
Figure 2:
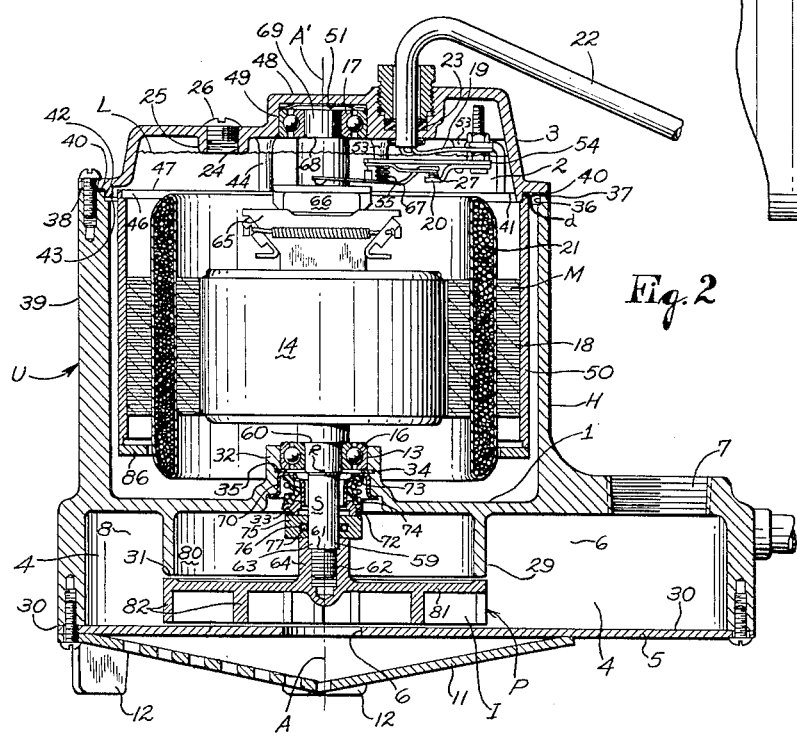

Other objects and advantages will more fully and at large appear from the following description of a preferred form and embodiment of my invention reference being had to the accompanying drawings in which Figure 1 is a top plan view of the unit embodying our invention; Figure 2 is a vertical section taken along the broken line 2—2 of Figure 1; Figure 3 is a vertical fragmentary section of the housing cover and stator only taken in the plane of the line 3—3 of Figure 1.

The unit U embodying our invention comprises a main, preferably cast bronze, generally cylindrical housing H having an integral central horizontal partition 1 above which lies the motor M and motor chamber 2 which is enclosed by a removable top cover plate 3. Below the partition lies the pump P in pump chamber 4 which is enclosed by a bottom cover plate 5 having an inlet orifice 6. The housing affords the offset outlet and discharge orifice 7 from the pump chamber; the latter being characterized by a non-involute annular substantially circular discharge passage 8 all around and higher than the impeller I. Preferably a cast perforate circular, conically dished screen and base plate 11 having short supporting legs 12 is secured to the housing below the bottom cover plate 5 and supports the unit and screens the fluid flowing to the inlet orifice 6.

The partition 1 has a centrally located necked aperture 13 through which extends the shaft S which carries the rotor 14 of the motor above the partition and the impeller I of the pump below the partition. The shaft is rotatably supported in a lower ball bearing 16 in the aperture 13 and by an upper aligned ball bearing 17 located in the center of the top cover plate 3. The stator 18 of the motor is assembled, secured to, carried by and aligned with the top cover plate, which with the electrical leads 19, starter switch 20 and windings 21 comprises a sub-assembly to be inserted in and attached to and carried by the housing after the rotor is located therein and for aligned coaction therewith. The electrical leads 19 pass through a flexible, preferably rubber-like, conduit 22 and are hermetically sealed therein and the conduit is in turn hermetically sealed with relation to the top cover plate in the air tight gland 23. After the unit is finally assembled and sealed as will be more fully described below and as shown in Figure 2, the motor chamber is filled preferably with "dry," clean additive-free and sulphur-free transformer oil through the filler hole 24 up to the level L, determined by the depth of the skirt 25, trapping a limited pre-determined quantity of moisture-free air thereabove after the threaded filler plug 26 is tightly secured into the tapped hole 24. The volume of air trapped above the level L in the pump chamber while small is preferably just sufficient to permit thermal and mechanical expansion of the oil and parts in the motor chamber without raising the pressure thereof beyond the point that will cause leakage of air or oil from the chamber at any place. The oil on the other hand in its whirling and agitated motion while the motor is running acts as a cooling agent carrying heat to the housing walls and also performs lubricating and insulating functions. Since the pump is submerged during most of its working life heat is readily dissipated from the exterior of the housing to the water or other liquid that is being pumped and/or in which the housing is submerged.

The housing H as mentioned above is preferably made of cast bronze or of other strong, machinable, non-corrosive material and serves, among other things, as the structural frame and body for the several constituent parts and elements of our unit. That is to say, we locate, align, support and protect the working parts of the unit by and in relation to the housing, its parts, locating points and trued surfaces. In more particular with the housing properly chucked for rotation about its central vertical axis A, as viewed in Figure 2, its bottom surface 30 is turned smooth, truly normal to the axis and brought into a plane accurately spaced with reference to a reference point on the axis of the housing and to the planes of other normal surfaces presently to be described. Similarly the lower edge surface 31 of the annular skirt 29, which is cast coaxially of the housing axis in the pump chamber, is turned normal to the housing axis and finished in a plane spaced accurately from the reference point and ipso facto from the plane of the parallel surface 30. The spacing of these planes locates the bottom plate 5 in relation to the skirt 29 and measures the desired clearance for the impeller I between the bottom plate and the lower edge 31 of the skirt. Not necessarily in the order of events just described, the aperture 13 is finished truly cylindrical and coaxial of the housing axis in the flanged neck 32 of the partition 1 to closely fit the exterior of the outer race of the bearing 16. The aperture is also turned coaxially to receive snugly the shell of the rotary seal 33. In a plane normal to the axis we cut a groove 34 adjacent the cylindrical part of the aperture that receives the bearing 16; the groove being narrow but wide enough to receive closely an expanding snap ring 35 upon which the outer race of the bearing 16 rests and from which the bearing gets its exact longitudinal location along the axis of the housing in reference to the planes of the surfaces 30 and 31 among others. The plane of the top surface of the groove 34 and snap ring 35 may at its intersection with the axis of the housing be conveniently used as the longitudinal reference point on the axis and will be so referred to as this description proceeds by designation R. It will be noted in passing that the bearing 16 locates the shaft S longitudinally and aligns or contributes to its alignment with the axis A in the first instance and during operation of the pump and motor.

To assure the correct alignment and position of the parts it remains to finish the upper surfaces and points of the housing to receive and locate the top cover plate correctly. To this end the extreme upper inner surface 36 is turned truly coaxial of the axis A and the annular upper end surface 37 and the top surfaces 38 of the external ribbed bosses 39 are turned to lie in closely spaced parallel planes normal to the axis A. These surfaces 37 and 38 are spaced sufficiently to receive and compress the annular gasket 40 between the end of the housing and the lower plane surface 41 of the top cover plate whilst the surface 41 bears directly on the surfaces 38 for accurate longitudinal relation to the reference point R. Similarly the surfaces 38 align the surface 41 truly normal to the axis A.

The top cover plate 3 is machined to complement the trued surfaces of the housing. That is, with the cover plate appropriately chucked and rotated about its vertical axis A', as viewed in Figure 2, the surface 41 is turned normal thereto and the external faces 42 of depending lugs 43 are turned to the diameter of the upper inner housing surface 36 to fit snugly and accurately therein. While only one of the lugs 43 is shown in Figure 2 at least three are equally spaced within the cover plate whereby to center and locate the axis of the cover plate exactly in the axis A of the housing when the parts are assembled as shown in Figure 2. The top cover plate also affords a plurality, three or more, of depending stator locating lugs 44, see also Figure 3, the external surfaces 45 of which are turned to true circular, cylindrical form coaxial with the cover plate axis and of smaller diameter than the diameter of the surfaces 42; the same being spaced a radial distance $d$ which, as shown in Figure 2, we prefer to be about twice the thickness of the stator shell 50, the upper inner surface 46 of which is turned to the same diameter as the surfaces 45 for snug aligned fit therewith. It is perhaps most convenient to note here that the stator shell 50 is of right circular, cylindrical form with the surface 46 truly coaxial therewith and has its upper extreme end surface 47 turned truly normal to the axis of the shell, so that upon bearing tightly against the surface 41 of the top cover plate with the surfaces 45 and 46 in tight contact the axis of the shell 50 will truly align with the axis A' of the cover plate and, when the latter is secured to the housing H, with the axis A of the latter. The top cover plate also embraces the upper rotor shaft bearing 17 in the interior recess of the central boss 48. Here the cylindrical surface 49 is formed coaxial of the axis A' for a close sliding fit with the exterior of the outer race of the bearing 17 and the recess is machined out to a depth a little deeper than the axial length of the bearing so that a resilient washer 51 may be interposed between the end of the bearing and the bottom of the recess. A removable clip 52, Figure 3, carried by the cover plate is provided to hold the bearing 17 in its lowermost position against the resilient downward urging of the washer 51 preparatory to receiving the upper end of the shaft S at final assembly; the surface 49 centering the bearing with respect to the axes A' and A to truly align the rotor in the housing and within the stator 18.

The locating, centering and aligning points and surfaces of the housing and cover plate having been established, we proceed to establish complementary points and surfaces in and on the coacting parts of the unit. The rotor shaft S having the rotor 14 secured to it is provided with a shoulder 60 at the upper limit of a reduced cylindrical portion that snugly fits the interior of the inner race of the bearing 16 with the shoulder 60 engaging the upper end of that race and locating the rotor and shaft longitudinally in the housing and coaxially of the axis A when the bearing 16 rests on the snap ring 35 in the plane of the reference point R. The shaft S also extends at reduced diameter defining a smooth cylindrical surface 59 down through and past the rotary seal 33 to a lowermost shoulder 61 beyond which lies a threaded extension 62. The shoulder 61 is formed to engage the bottom of a counterbore 63 in the internally threaded neck 64 of the impeller I, and the shoulder 61 being accurately spaced from the reference point locates the top surface of the impeller closely clearing the lower surface 31 of the skirt 29 and the bottom surface of the impeller closely clearing the bottom cover plate 5.

Above the rotor the shaft S also carries a centrifugal governor or actuator 65 with conventional weights and springs as shown in Figure 2, which at a predetermined speed will give axial motion to a collar 66 slidable on the shaft S to actuate the starting switch 20 through the yoke 67; the parts being shown with the switch closed in the starting position. Near the upper end of the shaft S is turned a shoulder 68 beyond which extends a smooth cylindrical extension 69; the shoulder bearing axially on the inner race of the bearing 17 and the extension 69 closely fitting the interior of the inner race whereby to center and align the shaft on the axis A of the housing. The shoulder 68 is so spaced from the reference point R that when the top cover plate is clamped "home" on the housing that the shoulder 68 will tend to raise the bearing 17 a little against the yielding of the washer 51 so that there will be no loose axial play between the parts and the rotor will be forcibly and resiliently held between the bearings 16 and 17 and the bearing 16 held secure on the snap ring at the reference point R; the washer 51 affecting proper location of the shaft, rotor and impeller and compensating against thermal expansion and contraction as well as bearing wear throughout the long life of the unit.

An appropriate first step in assembling the unit or making a sub-assembly of housing, rotor, seal and impeller comprises inserting the snap ring 35 in the groove 34 in the neck 32. Then the rotor and shaft S with the bearing 16 pressed thereon is lowered into the housing; the bearing sliding into the aperture 13 and coming to rest on the ring 35 and assuming the position shown in Figure 2. Then or theretofore as convenience suggests the static parts of the rotary seal 33 are pressed into the lower part of the aperture 13, more particularly the seal housing 70 of relatively light metal being pressed into fluid-tight engagement with the lower part of the aperture 13; the flange 71 facilitating inward movement and contact of the housing 70 with the snap ring 35. The seal 33 which may be of conventional form includes a static floating element or ring 72 resiliently urged downwardly by a spring 73 which also maintains a rubber-like sleeve 74 in fluid-tight contact with both the housing 70 and the ring 72; the sleeve also preferably resisting and limiting movement of the ring away from the housing while permitting it to have desirable "float" for continuous running sealing contact with the rotating seal ring 75 that is slid on and has a close sliding fit on the shaft extension 59 and has a fluid tight seal therewith via the "O" ring 76 in the internal groove 77 thereof. With the seal parts in substantially the position shown in Figure 2 the impeller I is screwed onto the end of the shaft S until its counterbore 63 bottoms on the shoulder 61 positioning the impeller as described above and securing it to the shaft normal thereto; the threads on the shaft and in the neck of the impeller being of the "hand" to preserve engagement of the parts under the influence of the direction of rotor rotation. In this stage of assembly the rotor may be held from the open top of the housing while the impeller is screwed home. When the impeller is "home" on the end of the shaft the ring 75 is advanced along the extension 59, contacting the sealing element 72 and compressing the seal spring 73 to bring all the parts of the seal 33 to their desired state of coaction for efficient operation.

When the impeller is "home" on the end of the shaft it clears the surface 31 with a minimum contact-free tolerance, whereby to exclude substantially all but very fine solid matter from gaining access to the chamber 80 which lies within the skirt 29 above the impeller and below the housing partition 1; the skirt being formed integrally with the housing and the impeller having a continuous imperforate upper web 81 cast integral with its neck 64 and from which depend, preferably curved, vanes 82, the lower edges of which lie in a plane normal to the axis of the shaft and closely spaced from the plane 30 and the upper surface of the bottom plate 5. The upper marginal edge of the web 81 is preferably turned smooth and truly normal to the shaft axis to perfect the close clearance with the edge 31.

The skirt 29 performs a diving bell function with respect to the chamber 80, trapping air therein and thereby preventing liquid or other matter from rising toward, much less to contact with the seal or bearing 16. Whatever liquid, solid or mixed matter makes its way into the chamber 80, when the pump is idle, is tended to be centrifugally ejected therefrom when the pump is operating and especially so at the end of any pumping cycle when air is drawn into the pump as when the sump in which the pump is operating is pumped dry. The skirt 29 also defines the shape of the discharge passage 8 of the pump making it as shown in Figure 2 and as can be observed from Figure 1 of substantial uniformly rectangular torus shape all around the impeller except adjacent the offset discharge chamber near the outlet orifice 7. The passage 8 stands more than twice the height of the impeller and is substantially as wide as the diameter of the inlet orifice, 6, and facilitates the free flow of large volumes of liquid at relatively low internal velocity with little friction loss and consequent high efficiency especially in the service of pumping of sumps at relatively low heads, as from 10 feet to 25 feet for which our pump is especially adapted with this form of passage.

Attachment of the bottom cover plate 5 and the base and screen 11 by the screws, as shown in Figure 2, completes the assembly or sub-assembly of the rotor and lower parts of the unit. As suggested above and as shown in Figures 2 and 3, the stator 18, windings, leads and starter switch comprise a separate sub-assembly with the top cover plate 3 now to be more fully described.

In this preferred form of our invention and for a pump with a capacity of about 3300 gallons per hour at 10 feet of discharge head we find that about a ⅓ H. P. single phase, split phase induction motor is adequate and readily powered from single phase A. C. circuits most commonly available for power supply. The starter windings 21 of such motors, as is well-known, include main and auxiliary windings; the latter being cut out in the conventional way by the starting switch 20 at the speed determined by the centrifugal actuator or governor 65. In our invention, contrary to prior practice, we locate our starting switch 20 and particularly the contact points 27 thereof below the oil level L. We have found that by employing copper-tungsten alloy for the points and immersing them preferably in very clean, moisture-free, additive-free, sulphur-free dry transformer oil that our switch is capable of hundreds of thousands of "makes" and "breaks" whereas the prior teaching and practice has always been that starter switches could not be employed for motors in submersible pump-motor units, much less in any oil or liquid filled and sealed motors. To mount and immerse our starter switch and gain the advantage of the sealing, location and immersion thereof we provide lugs 53 depending from the top cover plate, only two of which are shown in Figure 2, and faced off to lie below the oil level L and to and below which the switch plate 54 is attached as by screws not shown. The switch plate 54 in turn provides a support for the yoke 67 therebelow which in a conventional way under the influence of a spring 55 and the collar 66 closes the contact points 27 to cut in the auxiliary windings at slow or no speed and opens the contact points at the desired approach to full motor speed. The plate 54 also provides support for appropriate terminal connections for the leads 19 and windings 21.

The stator 18 with the windings 21 takes conventional form as to annular laminations and a central bore providing an air gap and clearance for the rotor with the winding appropriately disposed. Externally the stator laminations are bonded to the interior of the cylindrical shell 50, and the upper end surface 47 of the shell is turned truly normal to the axis of the bore of the stator and spaced from the top lamination thereof accurately to line up the stator and rotor longitudinally when the top cover 3 is tightly secured to the housing. The upper inner cylindrical surface 46 of the shell, as mentioned above, is turned coaxial with the bore of the stator and by coaction with the cover lugs 44 aligns the axis of the bore of the stator with the axis A. It remains to fasten the shell 50 to the top cover plate 3 in its intended relation. For this purpose, as shown in Figure 3, a plurality of the cover lugs 44 are tapped to receive the threaded ends of a plurality of "through" bolts 85 that pass through appropriate holes in the stator laminations adjacent the shell 50 and through appropriate apertures in the ring 86; the ring underlying and engaging the lower end of the shell 50 and the heads of the bolts 85 bearing on the ring through lock washers 87. Thus with the upper end of the shell located by the lugs 44 and bearing on the true surface 41 and with the shell and stator fixedly secured to the top cover plate by the bolts 85 and ring 86 it is assured that the stator will take its proper position with respect to the rotor when the cover plate is properly secured to the housing.

The sub-assembly of top cover plate 3 with starting switch 20, top bearing 17, windings and leads appropriately connected and sealed in the conduit 22 and the latter sealed in the gland 23 is ready for insertion into the housing; the stator encompassing the rotor, the upper end of the rotor shaft entering the top bearing and the starter switch yoke engaging the collar 66 to bring the parts into cooperative and operative relation. With the gasket 40 compressed between the cover plate and the upper end of the housing when the cover is secured to the housing as by the cap screws entering the tapped holes in the housing ribs 39 the assembly of the unit is complete. Whereupon the motor chamber is filled with oil to the level L and sealed by the plug 26. Thereafter the unit is ready for a long life of arduous service. While it has been mentioned that the gasket 40 is interposed between the continuous annular surface 37 of the end of the housing and a continuous annular part of the surface 41 whereby to accomplish the desired seal of the motor chamber, it should also be noted that the surface 41 is preferably not annularly continuous between the lugs 44 whereby to space the top end 47 of the stator shell from the cover between lugs. This facilitates movement of oil between the shell and the housing and facilitates machining the locating points on and adjacent the lugs.

Energization of the motor may be accomplished by manual switches, not shown, admitting current thereto through the leads 19. Automatic operation of the unit depending on the level of liquid in which the unit is submerged may be accomplished by known liquid level responsive control switches and of such we prefer and mention by way of example the control disclosed in our copending application Serial No. 69,334, filed January 5, 1949 now Patent No. 2,635,546.

Pumps made according to our invention are completely submersible with the motor and bearings and starting switch hermetically sealed in oil for long trouble-free life. In the event of power failure and flooding of the sump in which our pump is located no harm can come to our unit since it has no part not intended to be submersed and protected against submersion. Our pumps will pump a sump substantially dry, are very compact and easy to install either as portable or permanently placed units.

While we have illustrated and described a preferred form of our invention and mentioned certain advantages and uses thereof, changes, improvements and other advantages and uses will occur to those skilled in the art who come to understand and practice our invention, and therefore we do not desire to be limited in the scope of our patent to the preferred form herein specifically illustrated and described nor in any manner inconsistent with the advance which our invention has made with respect to the state of the prior art.

We claim:

1. A submersible pump and motor unit comprising a generally cylindrical housing formed open at both ends and having a longitudinal axis and an integral transverse partition intermediate the ends of the housing, said partition having a central aperture within a longitudinally necked part of said partition along said axis, said partition dividing the interior of said housing into a motor chamber on one side of the partition and a pump chamber on the other side, a bearing located in said aperture and supported therein, a shaft coaxial of said axis and passing through and supported in said bearing, a rotor carried by said shaft in said motor chamber, an impeller carried by said shaft in said pump chamber, a motor cover closing said motor chamber, a stator coacting with said rotor, and a pump cover closing said pump chamber and coacting with said impeller, said partition having an integral annular skirt depending therefrom toward said impeller and open at the end adjacent said impeller and forming an air pocket below said bearing.

2. The unit of claim 1 in which said impeller has a continuous upper web with vanes depending therefrom, said web closely clearing the edge of said skirt and said vanes closely clearing said pump cover.

3. A submersible pump and motor unit comprising a generally cylindrical housing formed open at both ends and having a longitudinal axis and an integral transverse partition intermediate the ends of the housing, said partition having a central aperture within a longitudinally necked part of said partition along said axis, said partition dividing the interior of said housing into a motor chamber on one side of the partition and a pump chamber on the other side, a bearing located in said aperture and supported therein, a shaft coaxial of said axis and passing through and supported in said bearing, a rotor carried by said shaft in said motor chamber, an impeller carried by said shaft in said pump chamber, a motor cover closing said motor chamber, a stator carried by said cover for coaction with said rotor, and a pump cover closing said pump chamber and coacting with said impeller, the bore of the stator being coaxial of said housing axis and said stator being mounted in a sleeve the upper end of which extends beyond the stator and has one end surface coaxial of the stator bore and another end surface normal to said axis, said motor cover having complementary surfaces engaging said sleeve surfaces and located by engagement with the end of said housing to locate the axis of said stator in the axis of said housing coaxially of said rotor, and means for securing said stator sleeve in fixed relation to said motor cover with said sleeve and motor cover surfaces in tight engagement.

4. A submersible pump and motor unit comprising a generally cylindrical housing formed open at both ends and having a longitudinal axis and an integral transverse partition intermediate the ends of the housing, said partition having a central aperture within a longitudinally necked part of said partition along said axis, said partition dividing the interior of said housing into a motor chamber on one side of the partition and a pump chamber on the other side, a bearing located in said aperture and supported therein, a shaft coaxial of said axis and passing through and supported in said bearing, a rotor carried by said shaft in said motor chamber, an impeller carried by said shaft in said pump chamber, a motor cover closing said motor chamber, a stator coacting with said rotor, a pump cover closing said pump chamber and coacting with said impeller, a rotary oil seal between said partition and said shaft, electrical leads passing from said motor chamber through said motor cover, means for hermetically sealing said leads with respect to said motor cover and sealing said motor cover with respect to said housing, said motor chamber being filled with substantially moisture-free oil to a pre-determined level, and a starter switch for said motor located in said chamber below the level of oil therein when the motor is disposed in its operating position.

5. The unit of claim 4 in which said starter switch has copper tungsten alloy contact points immersed in said oil in said motor chamber.

6. The unit of claim 5 in which said shaft carries a centrifugally actuated axially sliding collar operatively connected to said switch and the same is disposed below the level of oil in said motor chamber.

7. A submersible pump and motor unit comprising a generally cylindrical housing formed open at both ends and having a longitudinal axis and an integral transverse partition intermediate the ends of the housing, said partition having a central aperture within a longitudinally necked part of said partition along said axis, said partition dividing the interior of said housing into a motor chamber on one side of the partition and a pump chamber on the other side, a bearing located in said aperture and supported therein, a shaft coaxial of said axis and passing through and supported in said bearing, a rotor carried by said shaft in said motor chamber, an impeller carried by said shaft in said pump chamber, a motor cover closing said motor chamber, a stator carried by said cover for coaction with said rotor, a pump cover closing said pump chamber and coacting with said impeller, a second bearing supported in said motor cover and yieldable means between said second bearing and said motor cover, said second bearing engaging an end of said shaft and resiliently urging said shaft toward said first named bearing.

8. The combination of a water submersible container, a split phase motor and a starting switch hermetically sealed in the container, electrical leads passing through a wall of the container and hermetically sealed with respect thereto, a motor shaft passing through a wall of the container, a rotary hermetic seal between said wall and said shaft, a bearing for said shaft in said container, said container being substantially full of moisture-free dirt-free transformer oil and a smaller quantity of dry gas, said switch having its contact points and actuating mechanism below the level of oil in said container and said gas cushioning the expansion of the contents of said container to a pressure less than that which will cause leakage of oil or gas through the said seals, a pump having a housing, part of said housing being integral with said container and including an annular skirt adjacent said shaft and rotary seal without said container, said skirt extending downwardly when said pump is in normal operating position and trapping air and excluding liquid from the place where said shaft passes through said container wall.

9. The combination of claim 8 with an impeller mounted on the end of said shaft with a continuous web spanning the said free edge of said skirt and closely spaced therefrom and forming a substantially closed chamber within said skirt.

10. In a motor pump unit having a rotor-impeller shaft the sub-combination of a removable cover plate having an axis coinciding with the axis of said shaft, a bearing carried in said cover plate concentric of its axis and slidably movable therealong and engageable with said shaft to rotatably support the same, a stator secured to said cover plate with its bore concentric to said cover plate axis, main and auxiliary windings on said stator, a starter switch with an actuating yoke carried by said cover plate and interposed in the circuit of said auxiliary windings, electrical leads for said circuits passing through said cover plate and hermetically sealed in relation thereto, said plate having an oil filler hole with a depending skirt extending below the inner surface of said plate, and oil covering said stator and said starting switch.

11. A submersible pump and motor unit comprising a generally cylindrical housing having a vertically extending longitudinal axis, a transverse partition intermediate the ends of the housing and having a central aperture along said axis and dividing the interior of said housing into a motor chamber above the partition and a pump chamber below, a bearing located in said aperture and supported therein, a shaft coaxial of said axis and passing through and supported in said bearing, a motor disposed within said motor chamber and adapted to drive said shaft, an impeller having an upper web carried by said shaft in said pump chamber, and an annular skirt depending from said partition toward said impeller and open at the end adjacent said impeller and forming an air pocket below said bearing.

12. In a motor pump unit having a rotor-impeller shaft the sub-combination of a housing having an integral partition transverse the axis of said shaft with an aperture concentric of said axis, a bearing for said shaft in said aperture, said aperture having an annular groove, a snap ring in said groove supporting and locating said bearing in the direction of said axis, said shaft having a shoulder resting on said bearing and being journalled therein and extending therebeyond in both directions and carrying a rotor immediately on one side of the bearing and removably carrying an impeller on the other side of the bearing, a rotary seal having one static part in fluid tight engagement with said aperture and bearing on said ring and another static part and a spring resiliently spacing said parts, and a rotary part held axially on said shaft by said impeller and sealed thereto and contacting said other static part and compressing said spring, said housing having an open ended integral annular skirt between said impeller and said bearing and surrounding said shaft adjacent said seal and forming an air trap around said seal.

References Cited in the file of this patent
UNITED STATES PATENTS

| | | |
|---|---|---|
| 1,638,387 | Baldwin | Aug. 9, 1927 |
| 1,908,620 | Zorzi | May 9, 1933 |
| 2,001,649 | Arutunoff | May 14, 1935 |
| 2,002,914 | Mendenball | May 28, 1935 |
| 2,020,513 | Mendenhall et al. | Nov. 12, 1935 |
| 2,217,746 | Hawley | Oct. 15, 1940 |
| 2,305,093 | Leflar et al. | Dec. 15, 1942 |
| 2,381,834 | Meredew et al. | Aug. 7, 1945 |
| 2,430,509 | Hoover | Nov. 11, 1947 |
| 2,478,706 | Peters | Aug. 9, 1949 |
| 2,517,233 | Peters | Aug. 1, 1950 |
| 2,547,947 | Kleis et al. | Apr. 10, 1951 |
| 2,598,484 | Adams | May 27, 1952 |
| 2,627,816 | Kaatz et al. | Feb. 10, 1953 |

FOREIGN PATENTS

| | | |
|---|---|---|
| 590,385 | Great Britain | July 16, 1947 |